United States Patent
Chou (10) Patent No.: US 7,095,689 B2
(45) Date of Patent: Aug. 22, 2006

(54) METHOD AND DEVICE FOR CONTROLLING THE ROTATING SPEED OF A SPINDLE OF AN OPTICAL DISK DRIVE THROUGH A WOBBLE SIGNAL, AN EEFS SIGNAL AND AN ESFS SIGNAL

(75) Inventor: Su-Hong Chou, Taipei Hsien (TW)

(73) Assignee: VIA Technologies Inc., Hsin-Tien (TW)

(*) Notice: Subject to any disclaimer, the term of this patent is extended or adjusted under 35 U.S.C. 154(b) by 520 days.

(21) Appl. No.: 10/249,062

(22) Filed: Mar. 13, 2003

(65) Prior Publication Data

US 2003/0174611 A1  Sep. 18, 2003

(30) Foreign Application Priority Data

Mar. 14, 2002  (TW)  ..................... 91104831 A (51) Int. Cl.
*G11B 7/00*  (2006.01)

(52) U.S. Cl. .................. 369/47.48; 369/53.34
(58) Field of Classification Search .............. 369/47.48, 369/47.43, 47.45, 47.47, 53.34
See application file for complete search history.

(56) References Cited

U.S. PATENT DOCUMENTS

| | | | | |
|---|---|---|---|---|
| 4,481,615 A | * | 11/1984 | Hioki | ....................... 369/47.43 |
| 4,623,939 A | * | 11/1986 | Machida et al. | ............. 369/239 |
| 5,640,383 A | * | 6/1997 | Kamoto et al. | .......... 369/275.3 |
| 6,125,089 A | * | 9/2000 | Shigemori | ................ 369/47.22 |
| 6,128,261 A | * | 10/2000 | Suzuki | ..................... 369/47.48 |
| 6,650,606 B1 | * | 11/2003 | Banno | ...................... 369/47.48 |
| 6,762,983 B1 | * | 7/2004 | Andoh | ....................... 369/47.4 |
| 2002/0110061 A1 | * | 8/2002 | Tsuji | ....................... 369/47.31 |
| 2003/0169656 A1 | * | 9/2003 | Chou et al. | ............... 369/47.28 |

FOREIGN PATENT DOCUMENTS

TW      366485      8/1999

* cited by examiner

*Primary Examiner*—W. R. Young
*Assistant Examiner*—Kyung D. Kim
(74) *Attorney, Agent, or Firm*—Winston Hsu (57) ABSTRACT

A method and device for controlling a rotation speed of a spindle of an optical disk drive includes a frequency detector, two phase detectors, a frequency divider, a low pass filter, a switch circuit, and a drive circuit. The method uses a wobble signal, an encoder EFM frame synchronization (EEFS) signal, an encoder subcode frame synchronization (ESFS) signal, and other related signals to generate five control signals for controlling the rotation speed of a motor connected to the spindle of the optical disk drive. Using the five control signals, the method limits the phase difference between the Absolute Time in Pre-groove (ATIP) sync and the ESFS to be within a predetermined value, and thus improves an update rate and a writing efficiency.

20 Claims, 9 Drawing Sheets

METHOD AND DEVICE FOR CONTROLLING THE ROTATING SPEED OF A SPINDLE OF AN OPTICAL DISK DRIVE THROUGH A WOBBLE SIGNAL, AN EEFS SIGNAL AND AN ESFS SIGNAL

BACKGROUND OF INVENTION

1. Field of the Invention

The present invention relates to a method and device for controlling rotation speed of a spindle of an optical disk drive, and more particularly, to a method for controlling the rotation speed of the spindle of the optical disk drive by using a wobble signal and an encoder EFM frame synchronization (EEFS) signal.

2. Description of the Prior Art

In this modern information-based society, storing large amounts of information is a most important issue. Among the different kinds of storage media, compact disks (CDs) have become one of the most popular means of mass storage by virtue of their thin size and high storage capacity. Increasingly popular are recordable and rewritable CDs, which enable users of PCs having CD-R or CD-RW drives to record data to CDs.

To adequately manage data, the storage region of the CD is fragmented into many small frames. The CD also has a storage format that must be determined before writing data to a CD. An optical disk drive ascertains the storage format of the CD in advance to writing data onto the CD. The storage format refers additional frame information, including minute, second, and frame number that uniquely distinguish each frame. This additional frame information is known as Absolute Time in Pre-groove (ATIP).

Figure 1:
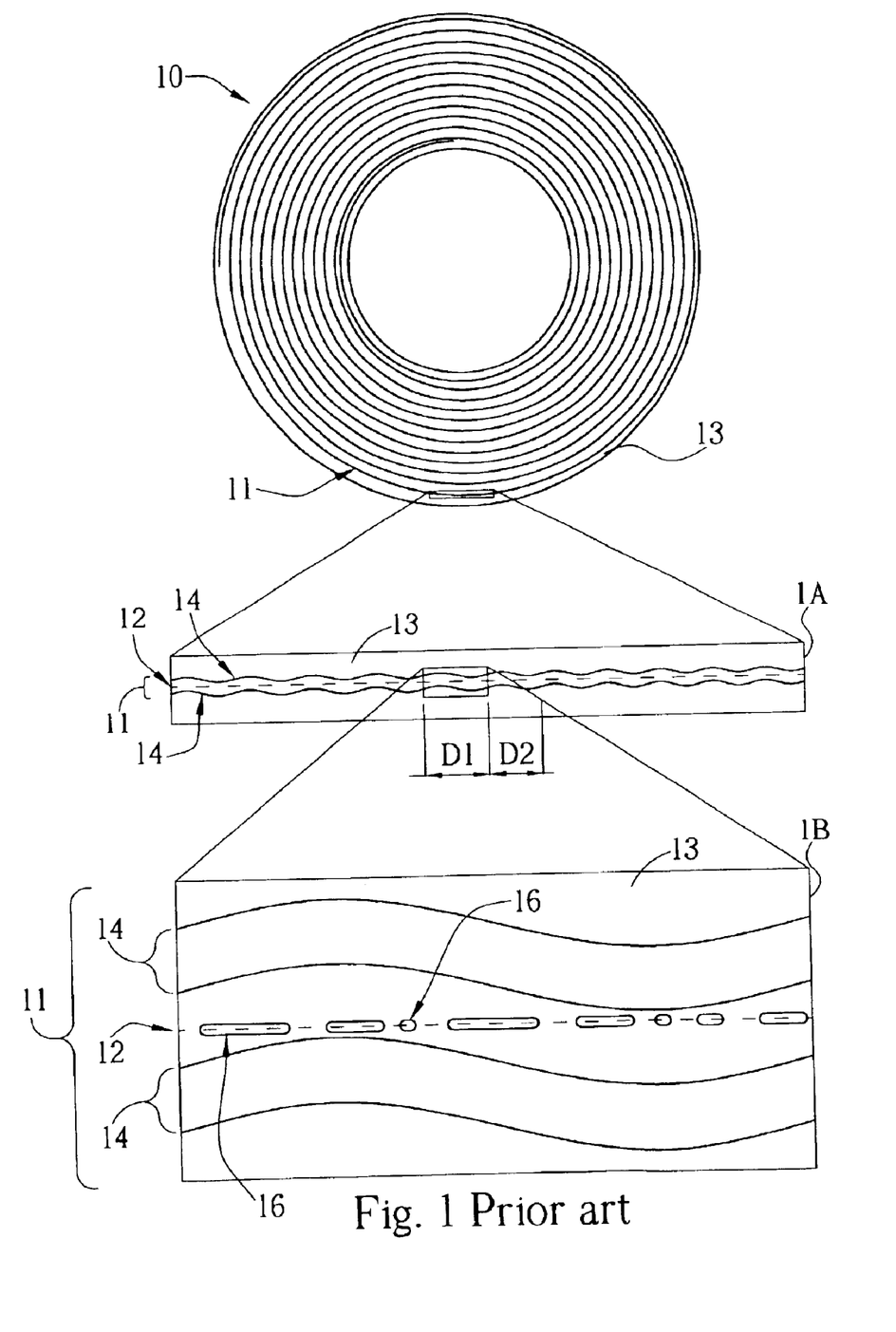
FIG. 1 is a top view of a prior art compact disk.

Please refer to FIG. 1, which is a top view of a prior art CD 10. It is well known in the art that the CD 10 has a reflective layer 13 that can reflect laser light. When the CD 10 is placed inside a CD-R drive (not shown), an optical pickup head emits laser light that is modulated by different reflection-modes and different parts of the reflective layer 13. The laser light is reflected back to the optical pickup head of the CD-R drive so the CD-R drive can read information stored on the CD 10. Following the curvature of the CD 10, the reflective layer 13 has a thin, long spiral track 11. View 1A shows a magnified region of the track 11. Track 11 comprises a data track 12 for recording information, and a wobble track 14 for recording the frame information of each frame of the CD 10. The data track 12 follows a spiral path along the curvature of the CD 10, but appears as a straight line in the magnified view 1A. When viewed close-up, the wobble track 14 reveals an oscillatory spiral shape that is also shown following a straight path in magnified view 1A. The wobble track 14 is made up of two different intervals D1 and D2, which have different periods.

Figure 2:
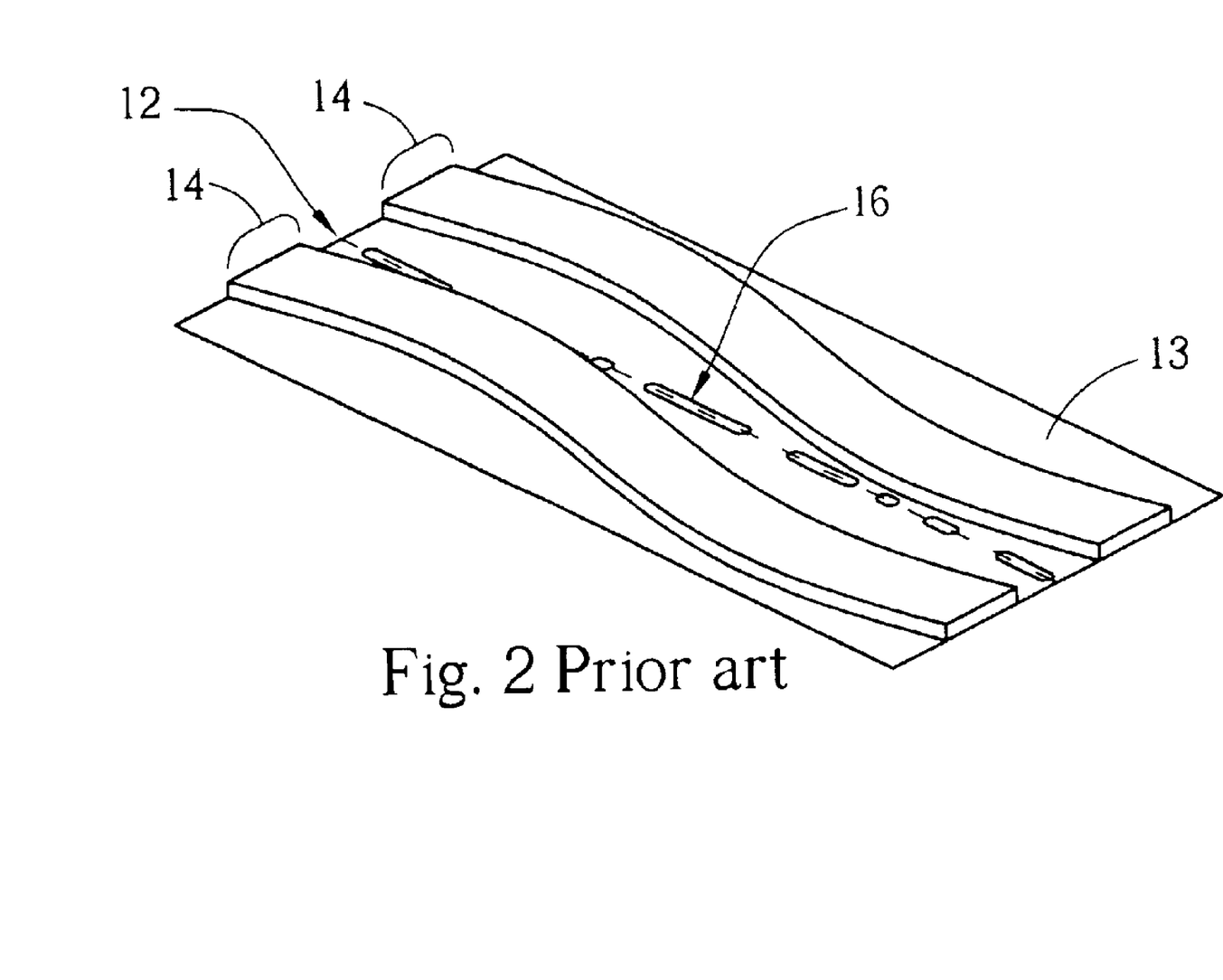
FIG. 2 is a perspective view of a magnified region of FIG. 1.

Magnified view 1B shows further detail of the data track 12 and the wobble track 14. The data track 12 is made up of discontinuous record marks 16 of varying length that store data. Data written to the CD 10 is encoded by controlling the length of the record marks 16. The wobble track 14 is used for storing information of each frame and is a continuous pair of tracks protruding out of the reflective layer 13. The raised structure of the wobble track 14 is shown in FIG. 2, which is a perspective view of magnified region 1B. In FIG. 2 the wobble track 14 is shown protruding out of the reflective layer 13, and the data track 12 comprising the record marks 16 is located in the groove between the protruding wobble tracks 14.

During the production of the CD 10, the wobble track 14 is made in advance to provide an ATIP signal to the CD-R drive so that data can be written to and read from the CD 10. The ATIP is generated from the wobble track 14 by means of frequency modulation (FM).

Figure 3:
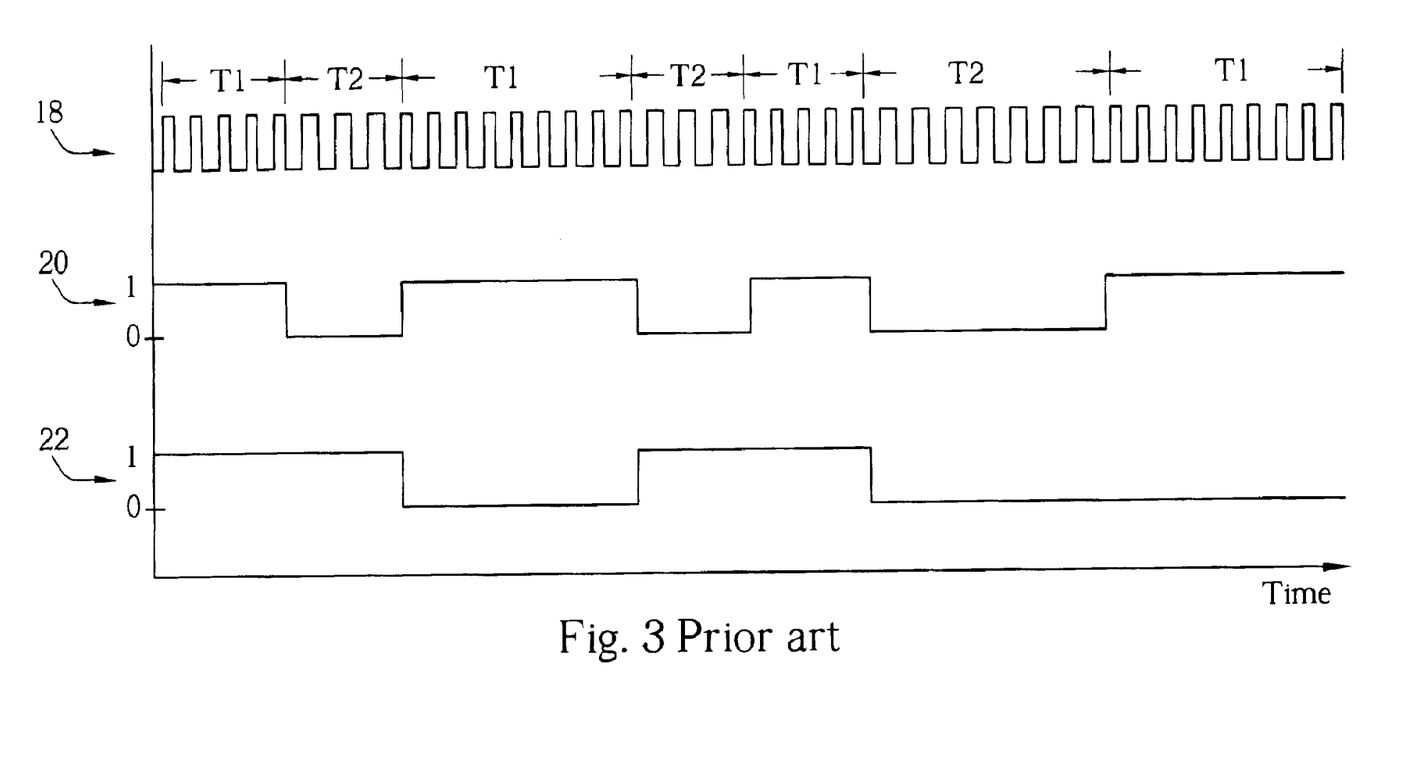
FIG. 3 is a schematic diagram of prior art wobble signal and ATIP signal.

Please refer to FIG. 3. FIG. 3. is a schematic diagram showing a prior art wobble signal 18 and a prior art ATIP signal 20. Since the wobble track 14 includes regions of two different periods D1 and D2, when the laser light is reflected by the wobble track 14 the generated wobble signal 18 comprises intervals of pulses of two different frequencies T1 and T2. The T1 interval of the wobble signal 18 represents a binary "1", and the T2 interval a binary "0". The corresponding ATIP signal 20 is thus generated by FM demodulation of the wobble signal 18. By demodulating the ATIP signal 20 a bi-phase signal 22 is generated, as summarized in the next paragraph.

Figure 4:
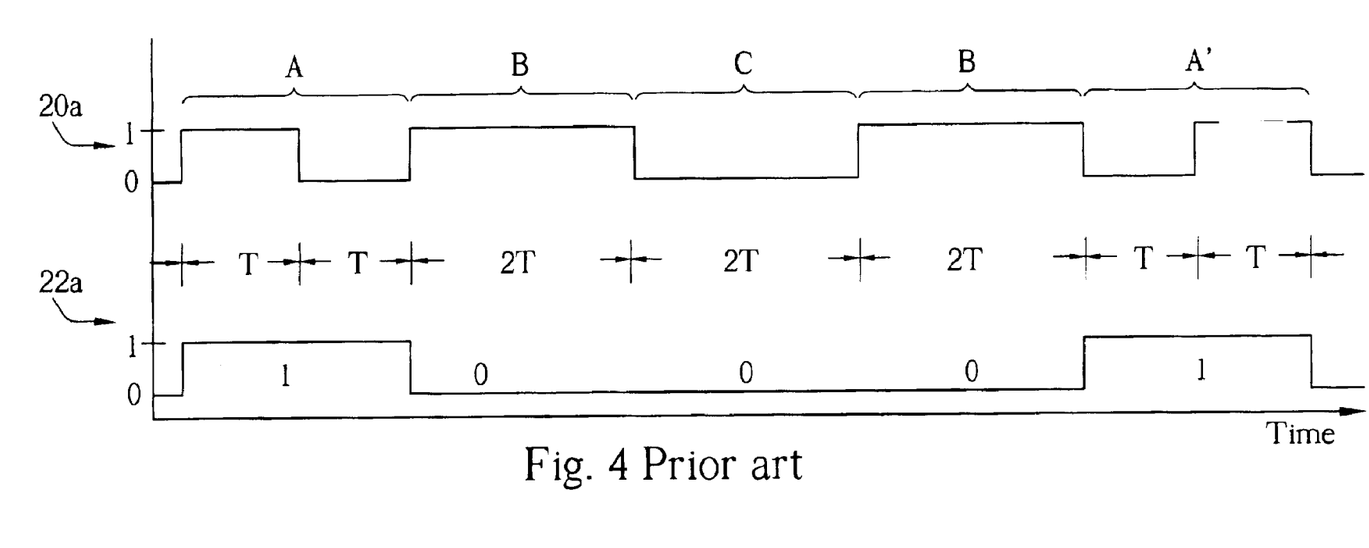
FIG. 4 is a schematic diagram of a prior art bi-phase signal generation process.

Please refer to FIG. 4, which is a schematic diagram of a prior art bi-phase signal 22a generation process. When a logic level change of a signal 20a occurs in the middle of a bit cell, a binary "1" is represented in bi-phase signal 22a, as shown in the regions A and A". Conversely, if a logic level of a bit cell "B" of the signal 20a remains "1", the bi-phase signal 22a is a binary "0" level. Similarly, if a logic level of a bit cell "C" of the signal 20a remains "0", the bi-phase signal 22a is also a binary "0". Accordingly, the interval between two contiguous changes in logic level is 1T or 2T.

Figure 5:
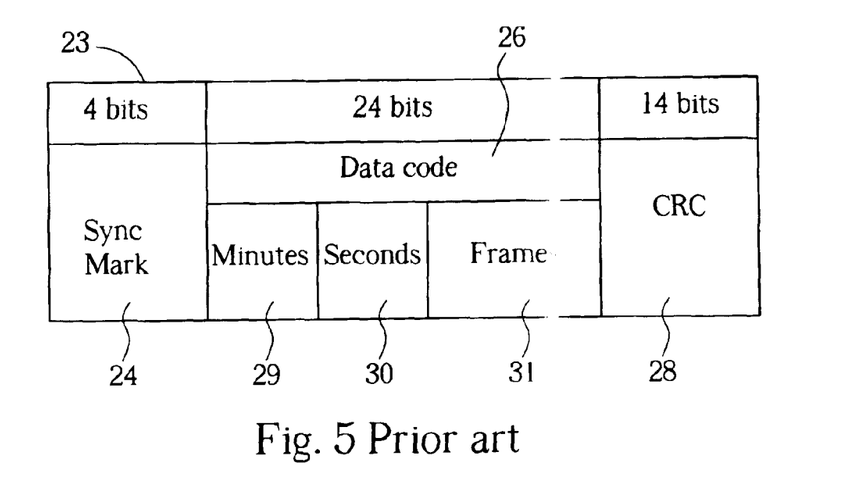
FIG. 5 is a schematic diagram of a prior art ATIP.

Please refer to FIG. 5, which is a schematic diagram of a prior art ATIP 23. The ATIP 23 is composed of several blocks, and each of the blocks is 42 bits in length. The ATIP 23 includes a 4-bit sync mark 24, a 24-bit data code 26, and a 14-bit cyclic redundancy check 28. The 24-bit data code 26 comprises information of minutes 29, seconds 30, and frames 31. After the ATIP 23 has been bi-phased, the 84-bit bi-phase data signal 22 is generated.

Figure 6:
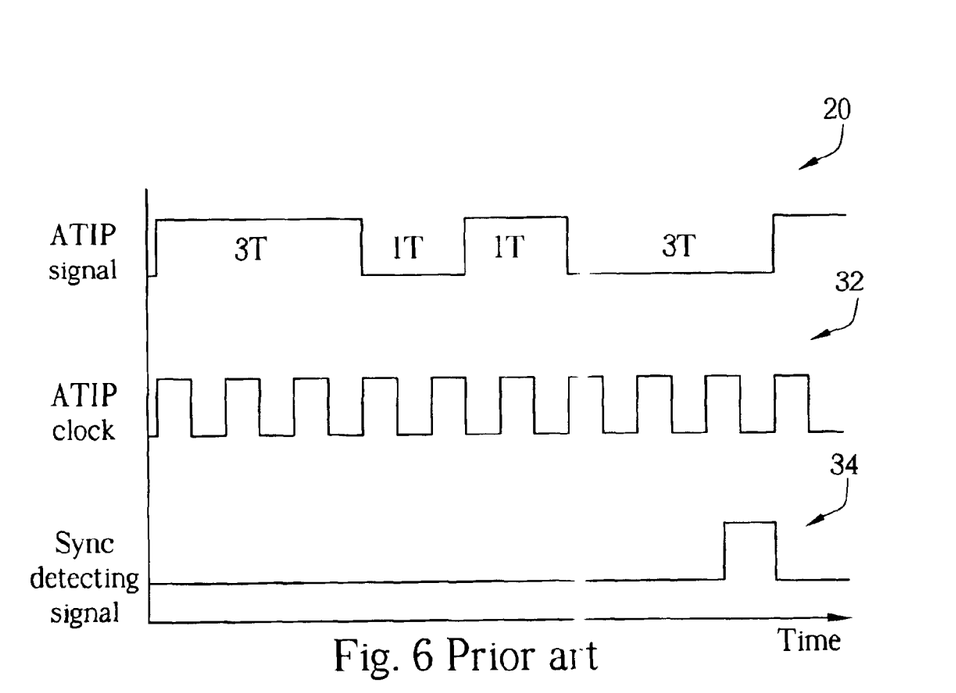
FIG. 6 is a schematic diagram of the sync mark shown in FIG. 5.

Please refer to FIG. 4 and FIG. 6. FIG. 6 is a schematic diagram of the sync mark 24 shown in FIG. 5. As shown in FIG. 4, the legal interval between two changes in level is 1T or 2T. However, there is still an illegal interval, 3T, available to detect the sync mark 24 in the header of the ATIP 23. The ATIP signal 20 format of the sync mark 24 is "3T-1T-1T-3T". Reading the sync mark 24 referencing an ATIP clock 32 generates a sync detecting signal 34. In this way, the optical disk drive uses the sync mark 24 to acquire information about the position of the CD 10 and establish a reference point so that the optical disk drive can record data onto the CD 10.

Figure 7A:
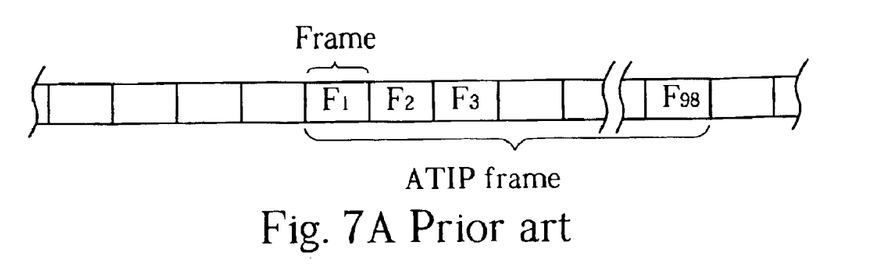
FIGS. 7A, 7B, and 7C are schematic diagrams of a prior art record frame.
Figure 7B:
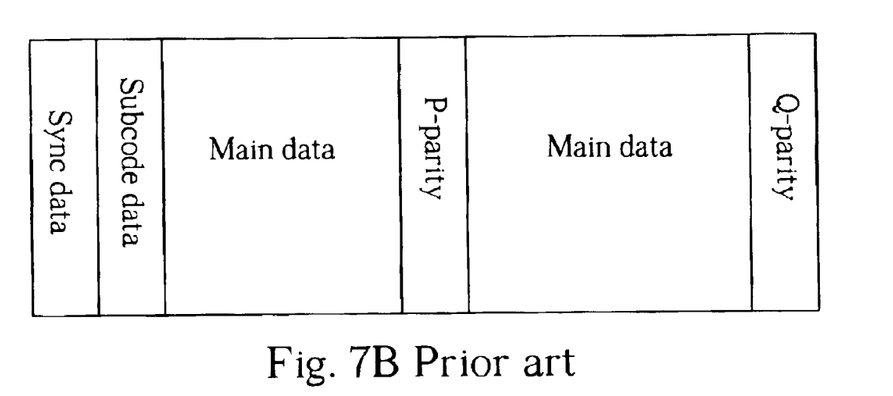
Figure 7C:
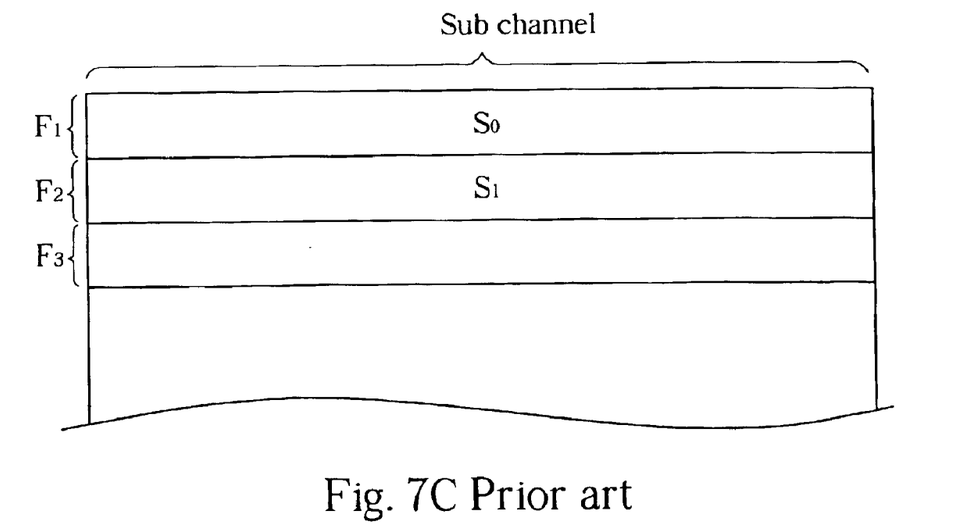

Please refer to FIG. 7A, which is a schematic diagram of a prior art frame. Data is stored on the CD 10 in the format of Eight to Fourteen Modulation (EFM) frames. An ATIP frame comprises 98 EFM frames, F1 to F98. Referring to FIG. 7B, each frame is composed of 588 bits, including sync data, subcode data, main data, p-parity, and q-parity. The main data, p-parity and q-parity form a main channel for storing the entity data, and the subcode data form a sub channel for storing information relative to the entity data, such as track number. In addition, as shown in FIG. 7C, the subcode data S0 of the first frame F1 and the subcode data S1 of the second frame F2 in the ATIP frame generate a subcode sync, which can be used to detect the synchronicity of an ATIP signal and a writing signal.

Moreover, the optical disk drive performs EFM to the data about to be stored according to an EFM write clock. The EFM write clock is synchronized with the writing data. The optical disk drive generates two reference clocks according to the EFM write clock. The first is an encoder EFM frame sync (EEFS), and the second is an encoder subcode frame sync (ESFS). Each frame data generates a corresponding EEFS, and each ATIP frame generates a corresponding ESFS. Since 98 frames form an ATIP frame, the frequency of the ESFS is 98 times that of the EEFS. The ESFS can thus serve as a reference signal to be compared with the ATIP in order to detect the synchronicity between the written data and the CD frame.

Figure 8:
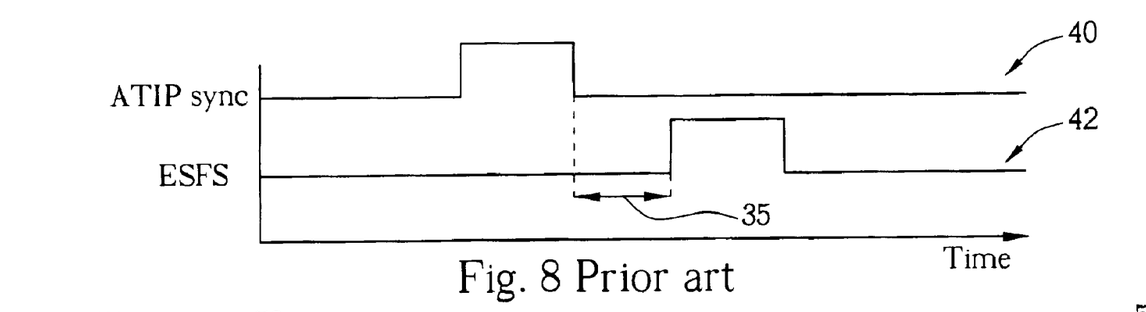
FIG. 8 is a schematic diagram of a prior art EEFS and ATIP sync.

Please refer to FIG. 8, which is a schematic diagram of prior art ESFS 42 and ATIP sync 40. According to the Orange Book definition, the deviation 35 between the ATIP sync 40 and the ESFS 42 must be controlled to be within two frames. If the deviation 35 is too large, problems such as overlapping arise.

The prior art method for controlling rotation speed of a spindle in art optical disk drive controls the motor using the wobble signal and EEFS of a CD, and causes the track of the CD run at a constant linear velocity. When the optical disk drive has entered the writing made and prepares to write data onto the CD, the optical disk drive controls the motor by the phase difference between the ATIP sync and the ESFS. The optical disk drive further changes the phase difference by passing the signal through a low pass filter (LPF) to adjust the rotation speed of the motor, so as to make the deviation between the ATIP sync and the ESFS meet the standard. However, the prior art only applies an LPF to adjust the rotation speed of the motor in order to change the phase difference between the ATIP sync and the ESFS. When the phase difference becomes too large causing the rotation speed of the motor to be too fast, the LPF needs more response time to control the rotation speed of the motor. In addition, controlling the motor by the phase difference of the ATIP sync and the ESFS results in the drawback of a slow update rate.

SUMMARY OF INVENTION

It is therefore a primary objective of the claimed invention to provide a method and a device to simultaneously exploit a wobble signal and an encoder EFM frame synchronization (EEFS) signal to control rotation speed of a spindle of an optical disk drive to solve the above-mentioned problems.

According to the claimed invention, the optical disk drive comprises a frequency detector and two phase detectors. The frequency detector generates a first control signal according to a phase difference between a first signal and a second signal. The first phase detector generates a second control signal according to a phase difference between the first signal and the second signal. The second phase detector generates a third control signal and a fourth control signal according to a phase difference between a third signal and a fourth signal.

According to the claimed invention, the method comprises three steps. The first is to adjust a rotational speed of a spindle according to the first control signal and the second control signal until the second control signal outputted from the first phase detector is steady having a fixed frequency difference between the first signal and the second signal. The second is that the first phase detector holds the second control signal after the first step to generate a fifth control signal according to the third control signal and the second control signal. The third is to adjust the rotational speed of the spindle according to the first control signal, the fourth control signal, and the fifth control signal after the second step until a phase difference between the signal and the fourth signal is less than a predetermined value.

It is an advantage of the claimed invention that phase differences between the five control signals are limited to be within predetermined values, and thus an update rate and a writing efficiency of the optical disk drive are improved.

These and other objectives of the claimed invention will no doubt become obvious to those of ordinary skill in the art after reading the following detailed description of the preferred embodiment that is illustrated in the various figures and drawings.

DETAILED DESCRIPTION

Figure 9:
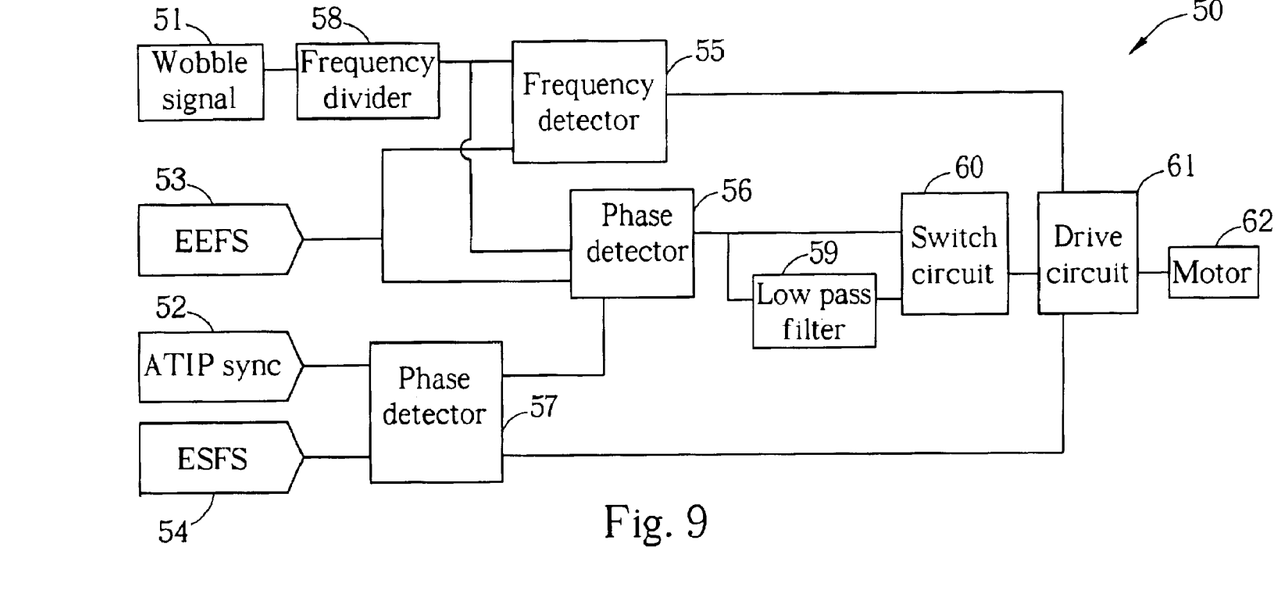
FIG. 9 is a schematic diagram of a motor controlling circuit of an optical disk drive according to the present invention.

Please refer to FIG. 9, which is a schematic diagram of a motor controlling circuit 50 of an optical disk drive according to the present invention. The optical disk drive reads a wobble signal 51 from a wobble track of a CD, and then decodes the wobble signal 51 to generate an ATIP signal and a corresponding ATIP sync 52 included in the ATIP signal. The optical disk drive simultaneously generates the corresponding encoder EFM frame sync (EEFS) 53 and encoder subcode frame sync (ESFS) 54. The motor controlling circuit 50 comprises a frequency detector 55, two phase detectors 56 and 57, a frequency divider 58, a low-pass filter 59, a switch circuit 60, and a drive circuit 61.

The frequency detector 55 is for detecting the frequency difference between the wobble signal 51, after being frequency-divided by the frequency divider 58 and the EEFS 53. The first phase detector 56 is for detecting the phase difference between the wobble signal 51, after being frequency-divided by the frequency divider 58, and the EEFS 53. The second phase detector 57 is for detecting the phase difference between the ATIP sync 52 and the ESFS 54. The frequency divider 58 is for converting the high frequency wobble signal 51 into a low frequency wobble signal. The low pass filter 59 is for smoothing the output of phase detector 56. The switch circuit 60 is for selecting the signal output of the first phase detector 56 or of the first phase detector 56 and the low pass filter 59. The drive circuit 61 is for controlling the rotation speed of a motor 62, which controls the rotation of a spindle (not shown), according to the output of the frequency detector 55, the switch circuit 60, and the second phase detector 57.

In practical application, optical disk drive could be a CD-R drive or a CD-RW drive. In the below description the optical disk drive records data at a standard rate of 1X, and accordingly the frequency of EEFS 53 is 75 Hz. The CD is rotating at the constant linear velocity relating to the 1X speed of the optical disk drive, and the wobble signal 51 comprises two frequencies, 21.05 kHz and 23.05 kHz. The average frequency of the wobble signal 51 is 22.05 KHz, so the frequency of ATIP sync 52 is 75 Hz.

Figure 10:
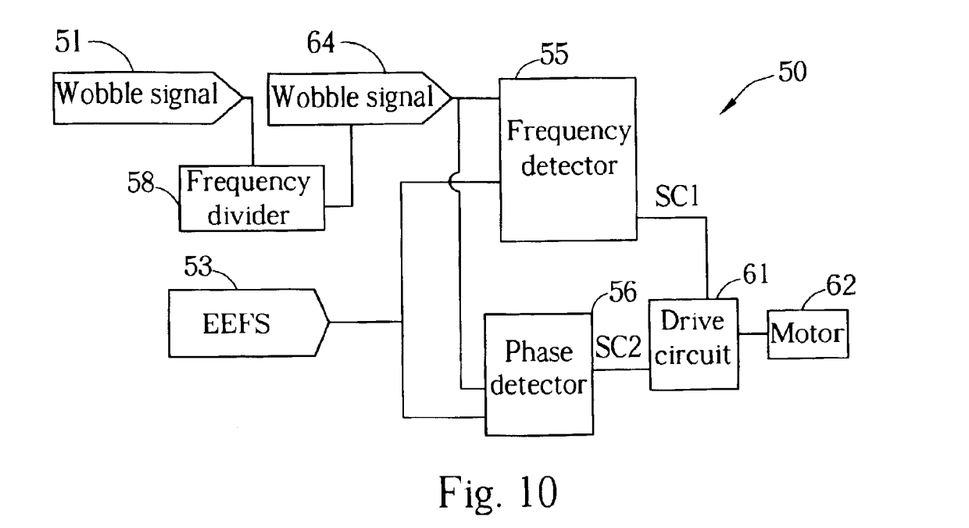
FIG. 10 is a schematic diagram of the motor controlling circuit of FIG. 9 operating in a CLV mode.

Please refer to FIG. 10, which is a schematic diagram of a motor controlling circuit 50 according to the present invention operating in a constant linear velocity (CLV) mode, wherein the rotation speed of the spindle is properly adjusted before actuating the following writing operations. The circuit 50 has the second phase detector 57 switched off and the switch circuit 60 is set to select the output signal of the first phase detector 56. Because the frequency of the wobble signal 51 is higher than that of the EEFS 53, the wobble signal 51 is frequency-divided in advance by the frequency divider 58 before being compared with the EEFS 53. When the CD spins stably, the frequency of the wobble signal 51 is 22.05 kHz, and the frequency of the EEFS 53 is 7.35 kHz. Therefore, it is possible to divide the frequency of the wobble signal 51 by 3 (three) using the frequency divider 58, and the result will be a low-frequency wobble signal 64. The frequency detector 55 then compares the EEFS 53 and the wobble signal 64. If the frequency of the wobble signal 64 is lower than that of the EEFS 53, the frequency detector 55 generates a first control signal SC1 to raise the frequency of the wobble signal 64. Conversely, if the frequency of wobble signal 64 is higher than that of the EEFS 53, the frequency detector 55 generates the first control signal SC1 to reduce the frequency of the wobble signal 64.

The first phase detector 56 is used to control the rotation speed of the motor 62 by generating a second control signal SC2 according to the phase difference between the wobble signal 64 and the EEFS 53. The rotation speed of the motor 62 is controlled by the drive circuit 61 to be faster as the phase difference between the wobble signal 64 and the EEFS 53 becomes larger. If the phase difference between the wobble signal 64 and the EEFS 53 is unstable, the rotation speed of the motor 62 will also be unstable. Therefore, the feedback mechanism formed by the frequency detector 55, the first phase detector 56, and the motor 62, causes the wobble signal 64 to be outputted at a fixed frequency when the CD rotates at a stable speed. When the frequency of the wobble signal 64 equals that of the EEFS 53, it means that the CD rotates stably at a constant linear velocity of 1X, and the second control signal SC2 that drives the motor 62 is generated by the first phase detector 56 according to the phase difference between the wobble signal 64 and the EEFS 53. So if the frequency of the wobble signal 64 equals that of the EEFS 53 then the optical disk drive rotates at a constant linear velocity, and the phase difference between the wobble signal 64 and the EEFS 53 is different at different places on the CD.

In the CLV mode, and according to the equation "V=ω*r", the varying radius r at which data is written to or read from the CD requires the angular velocity ω of the motor to be continuously modified to keep the linear velocity V constant. In practical application, the first and the second control signals SC1 and SC2 generated by the frequency detector 55 and the phase detector 56 respectively, and referring the wobble signal 51 and the EEFS 53, ensure that the optical disk drive motor 62 rotates stably imparting a constant linear velocity to the region of the CD being written to or read from.

Figure 11:
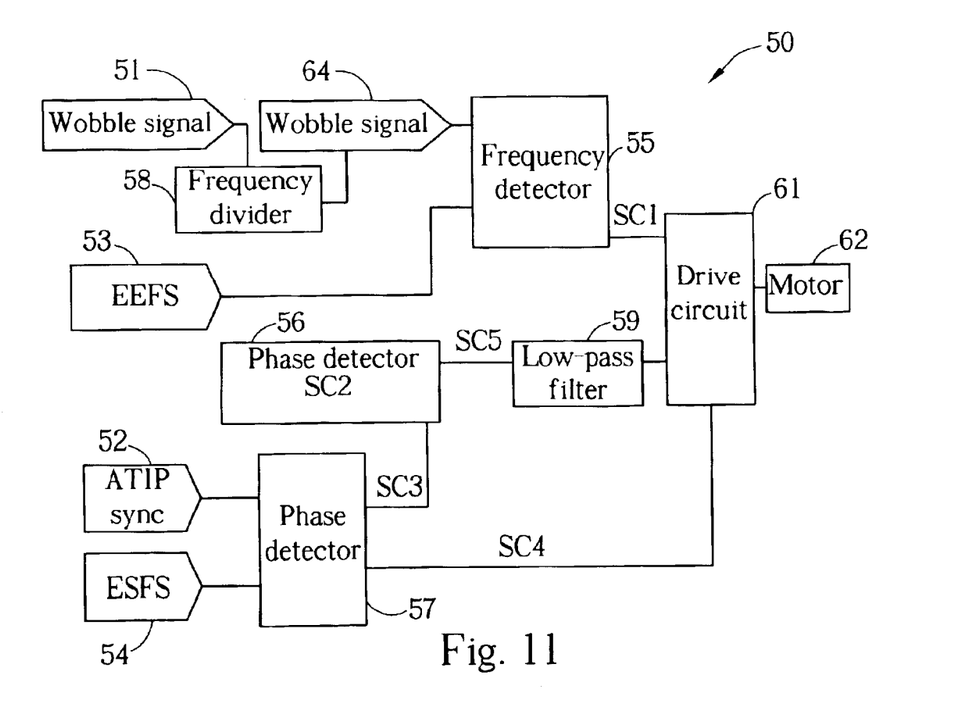
FIG. 11 is a schematic diagram of the motor controlling circuit of FIG. 9 operating in a write mode.

Please refer to FIG. 11, which is a schematic diagram of the motor controlling circuit 50 according to the present invention in a write mode. The circuit 50 now has the switch circuit 60 set to select the output of the low pass filter 59, and the second phase detector 57 turned on. The optical disk drive rotates at a constant linear velocity when the frequency of the wobble signal 64 equals that of the EEFS 53. When this occurs the optical disk drive enters the write mode, the second phase detector 57 is on, and the switch circuit 60 is set to select the output signal of the low pass filter 59. Meanwhile, the first phase detector 56 holds the second control signal SC2 previously generated by the phase difference between the wobble signal 64 and the EEFS 53. Since the ATIP sync 52 is generated by the wobble signal 51, if the frequency of the wobble signal 64 equals that of the EFS 53, then the frequency of the ATIP sync 52 will equal that of the ESFS 54.

The second phase detector 57 is responsible for detecting the phase difference between the ATIP sync 52 and the ESFS 54. If the phase of the ATIP sync 52 leads that of the ESFS 54, and the phase difference exceeds two frames, then the second phase detector 57 will output a third control signal SC3 to the first phase detector 56 to adjust the fifth control signal SC5, and generate a fourth control signal SC4 to input into the drive circuit 61. The first, fourth, and the fifth control signals SC1, SC4, and SC5 act to reduce the rotation speed of the motor 62 in order to reduce the phase difference between the ATIP sync 52 and the ESFS 54. The fifth control signal SC5 outputted from the first phase detector 56 is fed into the LPF 59 first in order to be smoothed, so that the fifth control signal SC5 performs a tuning effect on the rotation speed of the motor 62 until the phase difference between the ATIP sync 52 and the ESFS 54 is below two frames. In this operation, the second phase detector 57 adjusts the phase difference between the ATIP sync 52 and the ESFS 54, and the frequency detector 55 makes the frequency of the ATIP sync 52 and the frequency of the ESFS 54 equal.

Consider the following example. When the optical disk drive, which is in the CLV mode, makes the frequency of the wobble signal 64 equal to that of the EEFS 53, then the value of the first control signal SC1 outputted from the frequency detector 55 is "0", and the value of the second control signal SC2 outputted from the first phase detector 56 is "50". Therefore, the control value that the drive circuit 61 drives the motor 62 with is "50" (0+50). The optical disk drive then immediately enters the writing mode, and the first phase detector 56 keeps the value of the second control signal SC2 at "50". If the phase difference between the ATIP sync 52 and the ESFS 54 is beyond the definition of the Orange Book, making the value of the fourth control signal SC4 become "5", the value of the corresponding third control signal SC3 become "1", and the value of the fifth control signal SC5 become "51" (50+1), then the corresponding control value with which the drive circuit 61 drives the motor is "56". However, when the rotation speed of the motor 62 changes, the frequency of the wobble signal 51 and the ATIP sync 52 are affected. Furthermore, if the value of the first control signal SC1 outputted by the frequency detector 55 is "−5", the value of the fourth control signal SC4 outputted by the second phase detector 57 is "3", and the value of the third control SC3 signal is "1", then the value of the fifth control signal SC5 outputted from the first phase detector 56 becomes "52". After adjustment by the first, fourth, and fifth control signals (SC1, SC4, and SC5), the control value of the drive circuit 61 which drives the motor 62 becomes "50". The above steps are repeated continuously, until the frequency of the ATIP sync 52 and the ESFS 54 are substantially equal to each other and the phase difference between them meets the standard. Once this occurs, the optical disk drive can start writing data to the CD.

Figure 12:
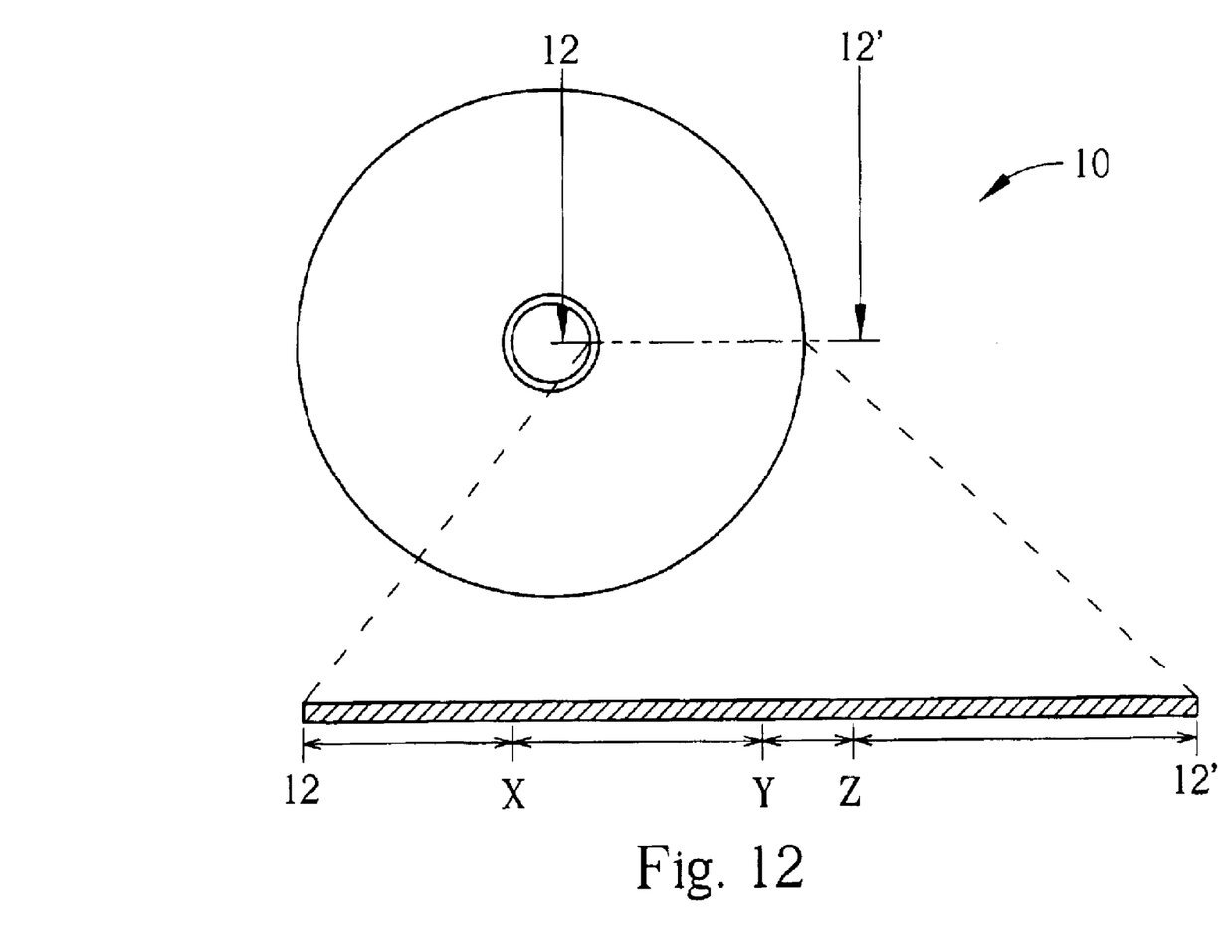
FIG. 12 is a schematic diagram of how the motor control circuit operates according to the present invention.

Please refer to FIG. 12, which is a schematic diagram of how the motor control circuit 50 operates according to the present invention. FIG. 12 shows a top view of a CD 10 with a magnified cross-section 12–12". When the optical disk drive is about to start recording data near a position Z on the CD 10, a pickup head moves to a position X by a "track-skip" method. Then the optical disk drive enters the CLV mode to make the motor 62 rotate at a speed that causes the a track of the CD 10 to pass the pickup head at a stable constant linear velocity. When the pickup head moves slowly from the position X to the position Z along the spiral track on the CD 10, the motor controlling circuit 50 adjusts the rotation speed of the motor 62 accordingly to maintain this constant linear velocity of the track. When the pickup head arrives at a position Y and the frequency of the wobble signal 64 equals that of the EEFS 53, the motor 62 rotates at a speed of 1X and the optical disk drive enters the writing mode. While in the writing mode, the motor controlling circuit 50 adjusts the speed of the motor 62 to limit the phase difference between ATIP sync 52 and the ESFS 54 to within two frames. When the pickup head arrives at the position Z of the CD 10, the optical disk drive can begin to write data.

In contrast to the prior art, the present invention method and device for controlling the rotation speed of the spindle of an optical disk drive not only controls the phase difference between the ATIP sync and the ESFS to be less than two frames, but also controls the motor rotation by referencing the wobble signal. Accordingly, the update rate is faster, and the efficiency of writing data to a CD is improved significantly.

Those skilled in the art will readily observe that numerous modifications and alterations of the device may be made while retaining the teachings of the inventions. Accordingly, the above disclosure should be construed as limited only by the metes and bounds of the appended claims.

What is claimed is:

1. A method for controlling a rotational speed of a spindle in an optical disk drive, the method comprising:
    deriving a first phase difference and a first frequency difference between a wobble signal and an encoder EFM frame synchronization (EEFS) signal;
    adjusting the rotational speed of the spindle by using the first phase difference and the first frequency difference until the first phase difference is substantially corresponding to a steady phase difference; and
    adjusting the rotational speed of the spindle in a write mode according to the first frequency difference and the first phase difference, and a second phase difference between of an Absolute Time in Pre-groove (ATIP) sync signal and an encoder subcode frame sync (ESFS) signal until the second phase difference is less than a pre-determined threshold.

2. The method of claim 1 wherein the first phase difference is held when adjusting the speed of the spindle in the write mode.

3. The method of claim 2 wherein the first phase difference is smoothed before being used for adjusting the speed of the spindle in the write mode.

4. The method of claim 1 wherein the optical disk drive operates with a constant linear velocity mode.

5. The method of claim 1 wherein the optical disk drive is a CD-R drive or a CD-RW drive.

6. The method of claim 1 wherein the wobble signal is frequency-divided before the first phase difference and the first frequency difference are derived.

7. A method for controlling rotational speed of a spindle in an optical disk drive, the method comprising:
    adjusting the rotational speed of the spindle according to a first control signal and a second control signal until the second control signal is steady with a fixed frequency difference between the first signal and the second signal;
    holding the second control signal to generate a fifth control signal according to a third control signal and the second control signal; and
    adjusting the rotational speed of the spindle in a write mode according to the first control signal, a fourth control signal, and the fifth control signal until a phase difference between the third signal and the fourth signal is less than a predetermined value.

8. The method of claim 7 wherein the first signal and third signal are both derived from a wobble signal.

9. The method of claim 7 wherein a frequency of the wobble signal is frequency-divided to derive the first signal.

10. The method or claim 7 wherein the third signal is an absolute time in pre-groove (ATIP) synchronization signal.

11. The method of claim 7 wherein the second signal and the fourth signal are derived when the optical disk drive outputs an ATIP frame.

12. The method of claim 7 wherein the second signal is an encoder EFM frame synchronization (EEFS) signal, and the fourth signal is an encoder subcode frame synchronization (ESFS) signal.

13. The method of claim 7 wherein the fifth control signal is smoothed before being used for adjusting the speed of the spindle in the write mode.

14. The method of claim 7 wherein the optical disk drive operates with a constant linear velocity mode.

15. The method of claim 7 wherein the optical disk drive is a CD-R drive or a CD-RW drive.

16. A controller of an optical disk drive, the optical disk drive comprising a motor for controlling spin of a disk according to rotational speed of a corresponding spindle, the controller comprising:
    a frequency detector for deriving a first frequency difference between a wobble signal and an encoder EFM frame synchronization (EEFS) signal;
    a first phase detector for generating a first phase difference between the wobble signal and the EEFS signal;
    a second phase detector for generating a second phase difference between of an Absolute Time in Pre-groove (ATIP) sync signal and an encoder subcode frame sync (ESFS) signal; and
    a driving circuit for controlling the rotational speed of the spindle, wherein the driving circuit adjusts the rotational speed of the spindle according to the first frequency difference and the first phase difference until the first phase difference is substantially steady, and the driving circuit adjust the rotational speed of the spindle in a write mode according to the first frequency difference and the first phase difference, and a second phase difference between an Absolute Time in Pre-groove (ATIP) sync signal and an encoder subcode frame sync (ESFS) signal until the second phase difference is less than a pre-determined threshold.

17. The controller of claim 16 wherein the first phase difference is held by the second phase detector when adjusting the speed of the spindle in the write mode.

18. The controller of claim 17 further comprising a low-pass filter for smoothing the first phase difference before the first phase difference is used for adjusting the speed of the spindle in the write mode.

19. The controller of claim 16 wherein the optical disk drive is a CD-R drive or a CD-RW drive.

20. The controller of claim 16 further comprising a frequency divider for frequency-dividing the wobble signal before the first phase difference is obtained by the fixst phase detector and the first frequency is obtained by the frequency detector.

* * * * *